(12) United States Patent
Nagai et al.

(10) Patent No.: US 10,116,180 B2
(45) Date of Patent: Oct. 30, 2018

(54) ROTARY ELECTRIC MACHINE STATOR

(71) Applicant: TOYOTA JIDOSHA KABUSHIKI KAISHA, Toyota-shi, Aichi-ken (JP)

(72) Inventors: Shingo Nagai, Toyota (JP); Hiroyuki Hattori, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 182 days.

(21) Appl. No.: 15/340,542

(22) Filed: Nov. 1, 2016

(65) Prior Publication Data
US 2017/0126086 A1 May 4, 2017

(30) Foreign Application Priority Data

Nov. 4, 2015 (JP) .................. 2015-216871

(51) Int. Cl.
| | | |
|---|---|---|
| H02K 3/34 | (2006.01) | |
| H02K 3/32 | (2006.01) | |
| H02K 1/14 | (2006.01) | |
| H02K 3/18 | (2006.01) | |
| H02K 3/24 | (2006.01) | |
| H02K 15/12 | (2006.01) | |

(52) U.S. Cl.
CPC .............. *H02K 3/34* (2013.01); *H02K 1/146* (2013.01); *H02K 3/325* (2013.01); *H02K 3/18* (2013.01); *H02K 3/24* (2013.01); *H02K 15/12* (2013.01)

(58) Field of Classification Search
CPC .............................................. H02K 3/32–3/345
USPC ........................................ 310/194, 214, 215
See application file for complete search history.

(56) References Cited

U.S. PATENT DOCUMENTS

| | | | |
|---|---|---|---|
| 6,333,573 B1 | 12/2001 | Nakamura | |
| 2009/0085422 A1* | 4/2009 | Kusawake | H02K 1/148 310/216.067 |
| 2014/0115875 A1 | 5/2014 | Baba | |
| 2015/0022050 A1* | 1/2015 | Sawada | H02K 3/34 310/215 |
| 2015/0256052 A1* | 9/2015 | Yoshida | H02K 3/522 310/45 |

FOREIGN PATENT DOCUMENTS

| | | |
|---|---|---|
| JP | 2001-86683 A | 3/2001 |
| JP | 2010-136571 A | 6/2010 |
| JP | 2014-087225 A | 5/2014 |

\* cited by examiner

*Primary Examiner* — Thomas Truong
(74) *Attorney, Agent, or Firm* — Sughrue Mion, PLLC

(57) ABSTRACT

A rotary electric machine stator includes a stator core, a multi-layer winding coil, a first insulating resin layer, and a second insulating resin layer. The multi-layer winding coil is arranged with a predetermined number of steps in the radial direction of the teeth. Each step of the multi-layer winding coil includes a lowest layer coil of one winding and a surface layer coil of another winding. The first insulating resin layer is arranged between the teeth and the lowest layer coil, or between an insulator that is fixed to the teeth and the lowest layer coil. The second insulating resin layer is arranged locally at curved portions of the multi-layer winding coil that correspond to corner portions of four corners of a rectangular cross-section of the teeth. The second insulating resin layer is arranged extending across a plurality of steps of the multi-layer winding coil.

13 Claims, 6 Drawing Sheets

ROTARY ELECTRIC MACHINE STATOR

CROSS REFERENCE TO RELATED APPLICATIONS

Pursuant to 35 U.S.C. § 119(a), this application claims the benefit of earlier filing date and right of priority to Japanese Patent Application No. 2015-216871 filed on Nov. 4, 2015, the contents of which, including the specification, drawings and abstract, are incorporated herein by reference in its entirety.

BACKGROUND

1. Field

The present disclosure relates to a rotary electric machine stator. More particularly, the present disclosure relates to a rotary electric machine stator that uses resin to fix a coil wound around a stator core.

2. Description of Related Art

Resin such as varnish is used to fix a coil wound around a stator of a rotary electric machine. For example, Japanese Patent Application Publication No. 2010-136571 (JP 2010-136571 A) describes using electric insulating material with high thermal conductance between the teeth and the coil, and using electric insulating material with low thermal conductance at portions such as the coil end, when fitting a coil formed in a wound state beforehand to the teeth and fixing it thereto by covering it with resin.

Japanese Patent Application Publication No. 2014-087225 (JP 2014-087225 A) describes a coil wound in a plurality of layers around teeth, in which a lower layer portion is impregnated with a low viscosity liquid varnish, and a resin in powder form is put on a surface layer portion where the varnish tends not to accumulate, and then adhered thereto, thus covering the surface layer portion.

SUMMARY

Fixing the coil using resin in a rotary electric machine stator makes it possible to prevent the coil from moving when there is external vibration or a temperature fluctuation or the like. On the other hand, when the coil is covered with resin, coolant or the like will not directly contact the coil, so the cooling performance of the rotary electric machine stator decreases. Therefore, a rotary electric machine stator in which the coil is able to be prevented from moving, while cooling performance is improved by enabling direct cooling with coolant or the like is desired.

One aspect of the present disclosure relates to a rotary electric machine stator that includes a stator core, at least one multi-layer winding coil, a first insulating resin layer, and a second insulating resin layer. The stator core includes an annular stator yoke, and a plurality of teeth that protrude toward an inner peripheral side from the annular stator yoke. The multi-layer winding coil is wound around a rectangular cross-section of the teeth that is perpendicular to a radial direction of the teeth. The multi-layer winding coil is arranged with a predetermined number of steps in the radial direction of the teeth. Each step of the multi-layer winding coil includes a lowest layer coil of one winding and a surface layer coil of another winding. The first insulating resin layer is arranged between the teeth and the lowest layer coil, or between an insulator that is fixed to the teeth and the lowest layer coil. The second insulating resin layer is arranged locally at curved portions of the multi-layer winding coil that correspond to corner portions of four corners of the rectangular cross-section of the teeth. The second insulating resin layer is arranged extending across a plurality of steps of the multi-layer winding coil.

With the rotary electric machine stator according to this aspect, the first insulating resin layer is formed between the teeth or the insulator and the lowest layer coil, and the lowest layer coil of the multi-layer winding coil is fixed to the teeth. Furthermore, the second insulating resin layer is formed locally at the curved portions of the multi-layer winding coil, and extending across each of the steps, so the steps of the multi-layer winding coil are fixed together. Also, the second insulating resin layer is formed locally at the curved portions of each step, and thus does not cover the entire multi-layer winding coil. The portion not covered by the second insulating resin layer is directly cooled by coolant or the like. As a result, movement of the coil is able to be prevented while improving cooling performance. Also, the amount of insulating resin that is used is able to be reduced.

In the rotary electric machine stator according to this aspect, the at least one multi-layer winding coil may include a pair of multi-layer winding coils arranged adjacent to one another with a slot therebetween. Also, the second insulating resin layer may extend across the slot between opposing curved portions of the pair of multi-layer winding coils.

With the rotary electric machine stator according to this aspect, one second insulating resin layer may be sufficient for the two multi-layer winding coils, so the number of man-hours required to form the insulating resin layers is able to be reduced, and the amount of insulating resin that is used is able to be further reduced.

In the rotary electric machine stator according to the aspect described above, the second insulating resin layer may also be arranged between the surface layer coil and a coil on a lower layer side of the surface layer coil, at the curved portions.

With the rotary electric machine stator according to this aspect, the second insulating resin layer is fixed not only between the surface layer coils that extend across the steps, but also between each layer of coils. Even at this time, the second insulating resin layer is formed locally at the curved portions of each step of the multi-layer winding coil, so the portion not covered by the second insulating resin layer is directly cooled by coolant or the like. As a result, even if the number of layers of the multi-layer winding coil is increased, the coil is able to be prevented from moving, and cooling performance is able to be improved.

In the rotary electric machine stator according to the aspect described above, the second insulating resin layer may also be arranged between the surface layer coil, a coil on a lower layer side of the surface layer coil, and the lowest layer coil at the curved portions.

In the rotary electric machine stator according to the aspect described above, the second insulating resin layer may extend across each of the steps of the multi-layer winding coil at the curved portions. Also, the second insulating resin layer may be arranged between a wall surface on the annular stator yoke side of a slot between adjacent teeth and the surface layer coil.

With the rotary electric machine stator according to this aspect, the second insulating resin layer is formed not only extending across each of the steps, but also between the wall surface on the stator yoke side of the slot and the surface layer coil. As a result, even if the number of layers of the multi-layer winding coil is increased, the coil is able to be prevented from moving, and cooling performance is able to be improved.

In the rotary electric machine stator according to the aspect described above, the second insulating resin layer may include a plurality of second insulating resin layers arranged locally at respective curved portions. Also, each second insulating resin layer of the plurality of second insulating resin layers may be separated from the other second insulating resin layers so as to provide a plurality of separation regions in which the multi-layer winding coil is exposed.

Another aspect of the present disclosure relates to a rotary electric machine stator that includes a stator core, at least one multi-layer winding coil, a first insulating resin layer, and a second insulating resin layer. The stator core includes an annular stator yoke, and a plurality of teeth that protrude toward an inner peripheral side from the annular stator yoke. The multi-layer winding coil is wound around a rectangular cross-section of the teeth that is perpendicular to a radial direction of the teeth. The multi-layer winding coil is arranged with a predetermined number of steps in the radial direction of the teeth. Each step of the multi-layer winding coil includes a lowest layer coil of one winding, a surface layer coil of another winding, and at least one intermediate layer coil of another winding arranged between the lowest layer coil and the surface layer coil. The first insulating resin layer is arranged between the teeth and the lowest layer coil, or between an insulator that is fixed to the teeth and the lowest layer coil. The second insulating resin layer is arranged locally at curved portions of the multi-layer winding coil that correspond to corner portions of four corners of the rectangular cross-section of the teeth. The second insulating resin layer is arranged extending across a plurality of steps of the multi-layer winding coil.

In the rotary electric machine stator according to the aspect described above, the second insulating resin layer may also be arranged between the surface layer coil and the at least one intermediate layer coil at the curved portions.

In the rotary electric machine stator according to the aspect described above, the second insulating resin layer may also be arranged between the surface layer coil, the at least one intermediate layer coil, and the lowest layer coil at the curved portions.

In the rotary electric machine stator according to the aspect described above, the second insulating resin layer may extend across each of the steps of the multi-layer winding coil at the curved portions. Also, the second insulating resin layer may be arranged between a wall surface on the annular stator yoke side of a slot between adjacent teeth and the surface layer coil.

In the rotary electric machine stator according to the aspect described above, the second insulating resin layer may include a plurality of second insulating resin layers arranged locally at respective curved portions. Also, each second insulating resin layer of the plurality of second insulating resin layers may be separated from the other second insulating resin layers so as to provide a plurality of separation regions in which the multi-layer winding coil is exposed.

According to the rotary electric machine stator of these modes of the present disclosure, the coil is able to be prevented from moving while cooling performance is improved.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
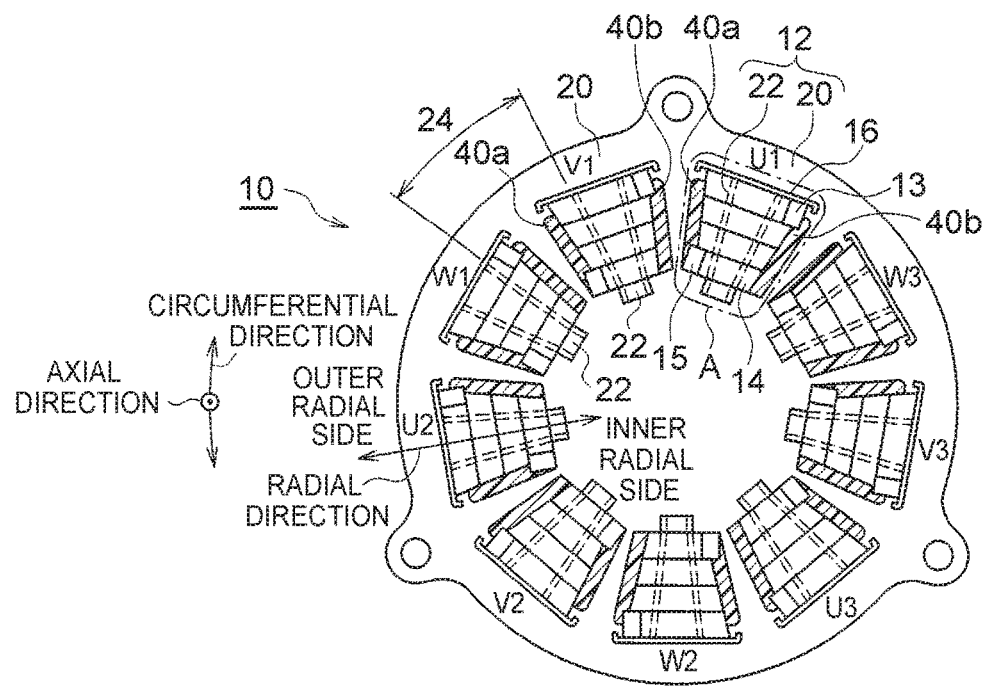
FIG. 1 is a plan view of a rotary electric machine stator according to an exemplary embodiment.

Hereinafter, exemplary embodiments of the present disclosure will be described in detail with reference to the accompanying drawings. In the description below, a stator used in a rotary electric machine mounted in a vehicle is described, but this is merely an example for the description. As long as the rotary electric machine stator uses a concentrated winding coil, the stator may be used for another purpose. In the description below, as the concentrated winding coil, a multi-layer winding coil that uses a flat wire is described, but this is merely an example for the description. Another type of wire other than a flat wire, such as a round wire having a circular cross-section or a conducting wire having an elliptical cross-section, may also be used.

The shape, number of teeth, number of windings, and material and the like described below are merely examples for the description, and may be suitably modified to match the specifications of the rotary electric machine stator. For example, as a multi-layer winding, a two-layer winding and a four-layer winding are described, but these are merely examples for the description. The multi-layer winding may also have a number of layers other than two or four. With the example of the two-layer winding, the total number of windings of the multi-layer winding is eight, but this is also only an example. The total number of windings may also be a number other than this. In the description below, like elements will be denoted by like reference characters in all of the drawings, and redundant descriptions will be omitted.

Figure 2:
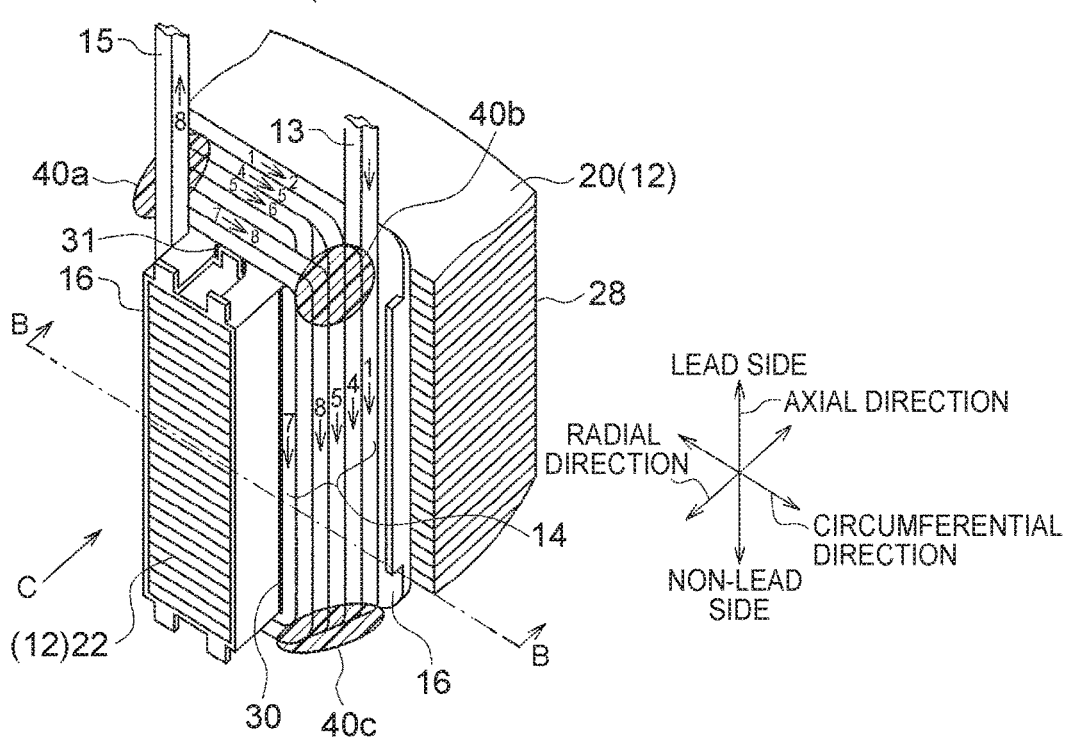
FIG. 2 is a perspective view of a portion A of FIG. 1.

FIG. 1 is a view of the structure of a rotary electric machine stator 10 used in a rotary electric machine mounted in a vehicle. FIG. 2 is a perspective view of portion A in FIG. 1. In the description below, the rotary electric machine stator 10 is not particularly limited, and will be referred to as the "stator 10". The rotary electric machine that uses the stator 10 is a three-phase synchronous rotary electric machine, and is a motor-generator that functions as a motor when the vehicle is powering, and functions as a generator when the vehicle is braking, according to control of a driving circuit. The rotary electric machine includes the stator 10 shown in FIG. 1, and an annular-shaped rotor arranged so as to be spaced a predetermined distance apart from, to the inner radial side of, the stator 10.

FIG. 1 is a plan view from the axial direction of the stator 10. The stator 10 includes a stator core 12, a coil 14 that is fitted to the stator core 12 and has a winding starting end 13 and a winding terminal end 15, and an insulator 16 arranged between the stator core 12 and the coil 14. The stator 10 also includes first insulating resin layers 30 and 31, and second insulating resin layers 40a, 40b, 40c, and 40d, that are used for fixing the coil 14 (see FIG. 5). The first insulating resin layers 30 and 31 and the second insulating resin layers 40c and 40d are hidden and thus not shown in FIG. 1. The second insulating resin layer 40d is hidden and thus not shown in FIG. 2.

FIGS. 1 and 2 are views both showing a circumferential direction, a radial direction, and an axial direction of the stator core 12. The circumferential direction is a direction that follows the circumferential direction of the stator core 12, the radial direction is a direction that follows an inner radial side and an outer radial side of the stator core 12, and the axial direction is a direction that follows the center axis of the stator core 12. In the axial direction, the side (i.e., direction) that the winding starting end 13 and the winding terminal end 15 of the coil 14 that is wound around the stator core 12 come out on is a lead side, and the opposite side (i.e., direction) is a non-lead side. This is also the same in FIG. 3 and thereafter. FIG. 1 is a view from the lead side in the axial direction.

The stator core 12 is an annular-shaped magnetic part, and includes an annular-shaped stator yoke 20, and a plurality of teeth 22 that protrude toward the inner peripheral side from the stator yoke 20. The spaces between adjacent teeth 22 are slots 24.

The stator core 12 is formed by a predetermined number of annular-shaped magnetic thin plates 28, each of which includes the stator yoke 20 and the teeth 22 and is formed in a predetermined shape such that the slots 24 are formed, that are stacked together. Magnetic steel sheet may be used as the material of these magnetic thin plates 28. Instead of the stacked body of the magnetic thin plates 28, a body made of magnetic powder that has been formed in a predetermined shape may be used.

The coil 14 is a concentrated winding coil, and is a multi-layer winding coil in which a single phase winding has been wound around a single tooth 22 a predetermined number of times by multi-layer winding. Coils 14 of different phases are arranged in one slot 24 between adjacent teeth 22.

A multi-layer winding coil is a coil in which a conducting wire is continuously wound around a rectangular cross-section that is perpendicular to the radial direction of the tooth 22, and is arranged wound with a predetermined number of steps in the radial direction of the tooth 22, with each step being formed by a plurality of layers of coil. In other words, the coil 14 that is a multi-layer winding coil is a coil in which an insulation coated conducting wire is wound for a predetermined number of steps with a predetermined number of layers by multi-layer winding, to form a predetermined total number of windings. When the number of layers is two, the coil is referred to as a two-layer winding coil, and when the number of layers is four, the coil is referred to as a four-layer winding coil.

Hereinafter, one entire multi-layer winding coil that is wound around one tooth 22 will simply be referred to as the "coil 14" regardless of the number of layers, and one winding of each layer that forms the coil 14 will be referred to as the "lowest layer coil" or the "surface layer coil" or the like. The example in FIGS. 1 and 2 shows the coil 14 of a two-layer winding coil having two layers, four steps, and a total of eight windings. The manner in which the conducting wire of the coil 14 that is the two-layer winding coil is wound will be described later with reference to FIGS. 3 and 4.

As the wire of the insulation coated conducting wire of the coil 14, copper wire, copper-tin alloy wire, or a silver-plated copper-tin alloy wire or the like may be used. As the wire, flat wire having a generally rectangular cross-sectional shape may be used. As the insulation coating, an enamel coating of polyamide-imide may be used. Instead of this, polyester-imide, polyimide, polyester, or formal or the like may be used.

One coil 14 is fitted to each tooth 22 of the stator core 12. In the example shown in FIG. 1, with the stator core 12, there are three U-phase teeth 22, three V-phase teeth 22, and three W-phase teeth 22, and one coil 14 is fitted to each of these nine teeth 22. Regarding the teeth 22 to which the coils 14 are fitted, in FIG. 1, reference characters U1 to U3 denote the U-phase teeth 22, reference characters V1 to V3 denote the V-phase teeth 22, and reference characters W1 to W3 denote the W-phase teeth 22. FIG. 2 is a view of the U1 coil in portion A of FIG. 1 extracted from FIG. 1.

Two coils 14 of the same phase are connected together by a connecting wire or the like. For example, the coils 14 that are fitted to the teeth U1 to U3 used for the U-phase are connected together by connecting wires to form a single U-phase coil, and one end of this U-phase coil is connected to a U-terminal of a power line. Similarly, the coils 14 fitted to the teeth V1 to V3 used for the V-phase are connected together by connecting wires to form a single V-phase coil, and one end of this V-phase coil is connected to a V-terminal of the power line, and the coils 14 fitted to the teeth W1 to W3 used for the W-phase are connected together by connecting wires to form a single W-phase coil, and one end of this W-phase coil is connected to a W-terminal of the power line. The other ends of the U-phase coil, the V-phase coil, and the W-phase coil are connected together to form a neutral point.

The insulator 16 is an insulating body that has a cylindrical shape and is arranged between the lowest layer coil of the coil 14 and the stator core 12 that face each other. The insulator 16 is fixed to the stator core 12 by fixing means such as adhesive. A sheet having electrical insulating properties that has been formed in a predetermined shape may be used for the insulator 16. Aside from paper, a plastic film may be used as the sheet having electrical insulating properties. When the electrical insulating performance of the insulation coating of the coil 14 is sufficient, the insulator 16 may be omitted. At this time, the coil 14 is arranged directly facing the peripheral surface of the tooth 22. In the description below, the insulator 16 will be provided.

Figure 3:
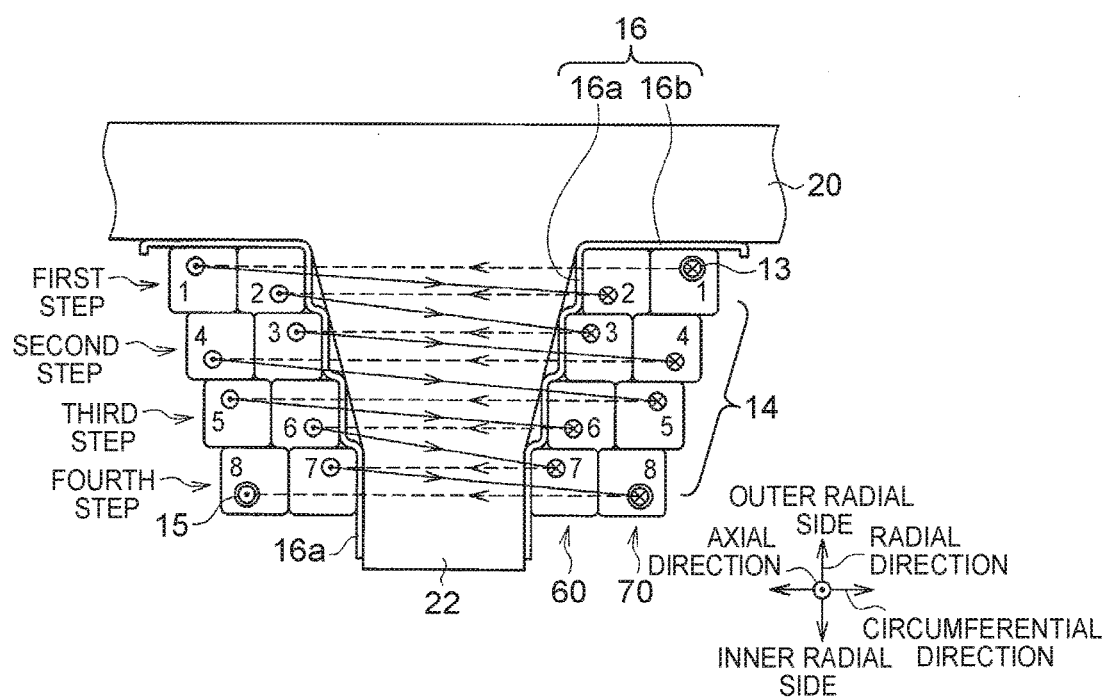
FIG. 3 is a sectional view taken along plane B-B of FIG. 2.
Figure 4:
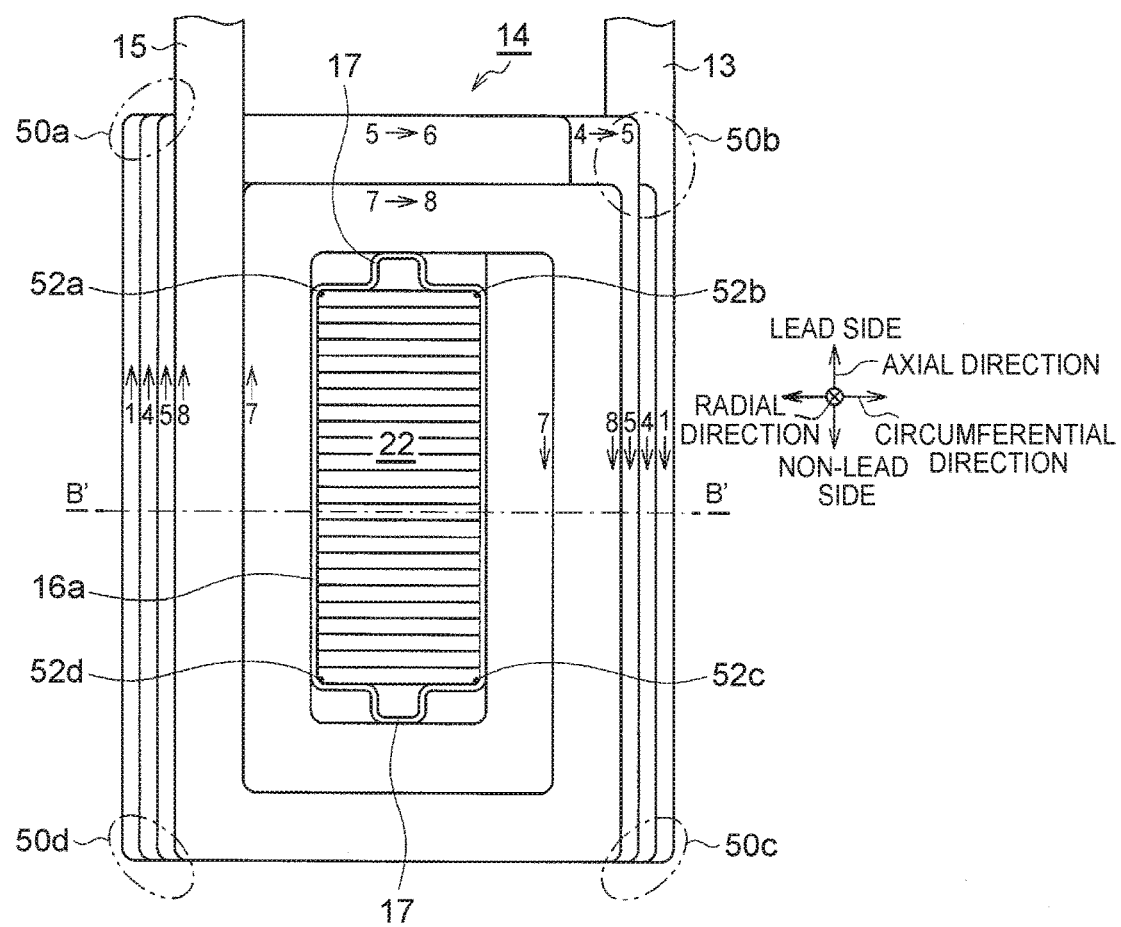
FIG. 4 is a view from direction C of FIG. 2.

FIGS. 3 and 4 are views illustrating the manner in which the conducting wire of the coil 14 that is the two-layer winding coil is wound. FIG. 3 is a sectional view taken along plane B-B in FIG. 2, and FIG. 4 is a view from direction C in FIG. 2. Line B'-B' in FIG. 4 corresponds to the plane B-B.

As shown in FIGS. 3 and 4, a flat wire having a rectangular cross-sectional shape may be used for the coil 14. A cross-section of the tooth 22 that is perpendicular to the radial direction is generally rectangular, and the tooth 22 has a tapered shape in which a width dimension in the circumferential direction of the rectangle gradually becomes smaller from the base side toward the tip end side in the radial direction. The insulator 16 includes a cylindrical portion 16a that follows the shape of the tooth 22, and a wall surface portion 16b that has a through-hole through which the tooth 22 passes and that contacts the stator yoke 20. Stair-shaped steps are provided on the side surface in the axial direction of the cylindrical portion 16a such that the flat wire shape of the coil 14 matches the tapered shape of the tooth 22. Also, an extending portion 17 that protrudes out to match the curved portion of the coil 14 is provided on both end sides of the cylindrical portion 16a in the axial direction. Hereinafter, unless otherwise specified, no distinction will be made between the cylindrical portion 16a, the wall surface portion 16b, and the extending portions 17, and these will simply be referred to as the "insulator 16".

Figure 5:
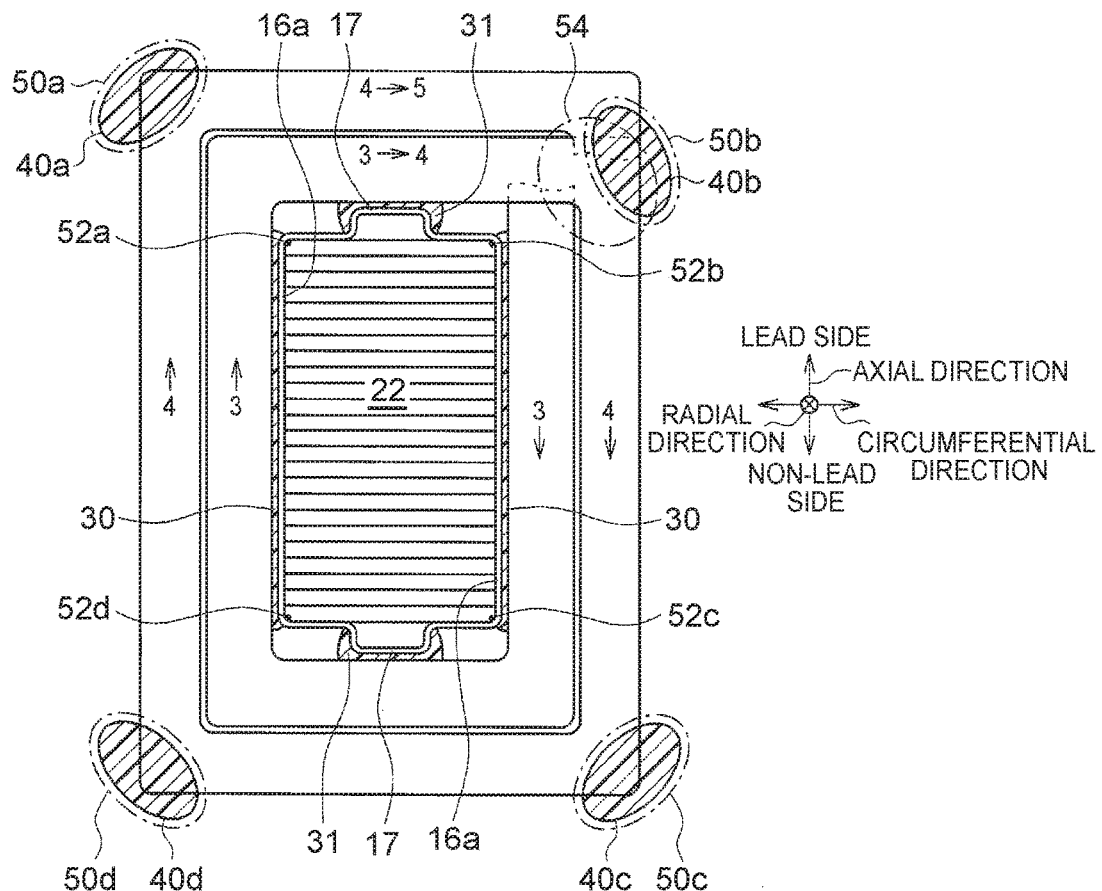
FIG. 5 is a view of the arrangement of a first insulating resin layer and a second insulating resin layer, for a winding on a second step from a base side toward a tip end side of a tooth, in a coil winding of FIG. 3.

In FIGS. 3 and 4, each winding of the coil 14 that has a total of eight windings is denoted by a number with an arrow. For example, "1 with an arrow" indicates a first winding that starts from the winding starting end 13, and "2 with an arrow" indicates a second winding that continues on from the first winding. This continues with "3 with an arrow" and so on, up to "8 with an arrow" that indicates the eighth winding that ends at the winding terminal end 15. "1-arrow-2" indicates a portion where there is a transition from the first winding to the second winding. Similarly, 4-arrow-5", "5-arrow-6", and "7-arrow-8" indicate a portion where there is a transition from the fourth winding to the fifth winding, a portion where there is a transition from the fifth winding to the sixth winding, and a portion where there is a transition from the seventh winding to the eighth winding, respectively. FIGS. 1 and 5 are also similar in this respect.

In the coil 14 that is a two-layer winding coil, the plurality of steps, arranged wound around in the radial direction of the tooth 22, are in the order of first step, second step, third step, and fourth step from the base side on the stator yoke 20 side of the tooth 22 toward the tip end side of the tooth 22, as shown in FIG. 3. Regarding the two-layer winding at each step, the one winding coil on the tooth 22 side will be referred to as a "lowest layer coil 60", and the one winding coil to the outside of the lowest layer coil 60 will be referred to as a "surface layer coil 70".

As shown in FIG. 3, on the first step, a first winding 1 is wound as a surface layer coil 70 from the winding starting end 13, and a second winding 2 that continues on from the first winding 1 is wound as a lowest layer coil 60. On the second step, a third winding 3 that continues on from the second winding 2 is wound as a lowest layer coil 60, and a fourth winding 4 that continues on from the third winding 3 is wound as a surface layer coil 70. On the third step, a fifth winding 5 that continues on from the fourth winding 4 is wound as a surface layer coil 70, and a sixth winding 6 that continues on from the fifth winding 5 is wound as a lowest layer coil 60. On the fourth step, a seventh winding 7 that continues on from the sixth winding 6 is wound as a lowest layer coil 60, and an eighth winding 8 that continues on from the seventh winding 7 is wound as a surface layer coil 70 and becomes the winding terminal end 15.

With this manner of winding, two-layer winding of the lowest layer coil 60 and the surface layer coil 70 is performed on the same step, and different steps are connected together by the lowest layer coils 60 or the surface layer coils 70. Therefore, the overall length of the conducting wire is able to be the shortest in the multiple step arrangement of the two-layer winding. On the other hand, winding of the lowest layer coil 60 is performed after winding of the surface layer coil 70 is performed on the same step, so it is difficult to continuously wind the conducting wire directly around the tooth 22. With the coil 14 wound in this manner, it may be preferable to employ a method in which a conducting wire is formed into a cassette coil using a jig such as a winding form beforehand, and the formed cassette coil is then fitted to the tooth 22, as opposed to winding the coil 14 directly around the tooth 22.

As shown in FIG. 4, the state viewed from the tip end side of the tooth 22 is a somewhat complex winding shape that reflects the manner of winding shown in FIG. 3. In FIG. 4, curved portions 50a, 50b, 50c, and 50d at the four corners of the winding of the coil 14 that is a two-layer winding coil are locations corresponding to corner portions 52a, 52b, 52c, and 52d of the four corners of the rectangular cross-section of the tooth 22. At the curved portions 50a, 50c, and 50d, the height position in the axial direction of all of the windings is the same. In contrast, at the curved portion 50b, the height in the axial direction of the curved portion at the transition from the third winding 3 to the fourth winding 4 and the curved portion at the transition from the seventh winding 7 to the eighth winding 8 is different from the height in the axial direction of the curved portion at the transition from the fourth winding 4 to the fifth winding 5. This is because although the portion at the transition from the third winding 3 to the fourth winding 4 and the portion at the transition from the seventh winding 7 to the eighth winding 8 remain at the height of the lowest layer coil 60 in the axial direction, the portion at the transition from the fourth winding 4 to the fifth winding 5 is at the height of the surface layer coil 70, as shown in FIG. 3.

FIG. 5 is a view of the winding portion at the second step taken from FIG. 3, which shows the positional relationship of the first insulating resin layers 30 and 31 and the second insulating resin layers 40a, 40b, 40c, and 40d. In FIG. 5, the gap between the insulator 16 and the lowest layer coil 60, and the gap between the lowest layer coil 60 and the surface layer coil 70 are shown overly wide. On the second step shown in FIG. 5, the lowest layer coil 60 is the coil denoted by "3 with an arrow", and the surface layer coil 70 is the coil denoted by "4 with an arrow".

The first insulating resin layers 30 and 31 and the second insulating resin layers 40a, 40b, 40c, and 40d are both provided to prevent the coil 14 from moving. The first insulating resin layers 30 and 31 fix the coil 14 to the insulator 16, while the second insulating resin layers 40a, 40b, 40c, and 40d locally fix the surface layer coils 70 of the steps of the coil 14 to each other. The reason that the second insulating resin layers 40a, 40b, 40c, and 40d do not completely cover the surface layer coils 70 is to expose the coil 14 and improve heat dissipation with coolant or the like.

The first insulating resin layers 30 and 31 are formed between the coil denoted by "3 with an arrow" that is the lowest layer coil 60, and the insulator 16. The first insulating resin layer 30 is formed by pouring a predetermined liquid resin into the gap between the lowest layer coil 60 and the surface layer coil 70 from the tip end side of the tooth 22 by means such as injecting or dripping, after fitting the coil 14 onto the insulator 16. As the predetermined liquid resin, insulating resin with a relatively low viscosity may be used so that it will spread out and seep into the gap between all of the lowest layer coils 60 from the fourth step to the first step, and the insulator 16. For example, a varnish with a relatively low viscosity may be used. Insulating resin is resin that has electrical insulating properties.

The first insulating resin layer 30 is formed between a side surface in the axial direction of the insulator 16, and the lowest layer coil 60 of each step, and the first insulating resin layer 31 is formed between the extending portions 17 of the insulator 16 and the lowest layer coil 60 of each step. In the example shown in FIG. 5, the first insulating resin layer 30 and the first insulating resin layer 31 are formed separated from each other, but they may also be formed connected together.

The second insulating resin layers 40a, 40b, 40c, and 40d are formed locally in locations corresponding to the curved portions 50a, 50b, 50c, and 50d, respectively, of the four corners of the coil denoted by "4 with an arrow" that is the surface layer coil 70. An insulating resin layer is not formed between the curved portion 50a and the curved portion 50b, between the curved portion 50b and the curved portion 50c, between the curved portion 50c and the curved portion 50d, and between the curved portion 50d and the curved portion 50a. The second insulating resin layers 40a, 40b, 40c, and 40d are formed extending across the surface layer coils 70 of the steps. Therefore, in the two-layer winding coil 14, the surface layer coils 70 of the steps are connected together by insulating resin. Here, the curved portions 50a, 50b, 50c, and 50d are locations that extend across the axial direction, the radial direction, and the circumferential direction of the coil 14. Therefore, providing the second insulating resin layers 40a, 40b, 40c, and 40d at the curved portions 50a, 50b, 50c, and 50d of the four corners makes it possible to even more effectively inhibit movement of the coil 14 compared to when they are provided at four locations of linear portions of the coil 14, for example.

The second insulating resin layers 40a, 40b, 40c, and 40d are arranged by means such as applying a predetermined resin from the outside of the surface layer coil 70 of the coil 14. As the predetermined resin, a liquid insulating resin with a relatively high viscosity, a semi-solidified insulating resin, a foam insulating resin that foams (i.e., expands) when heated, or a powdery insulating resin that flows and hardens when heated, or the like may be used. When the pouring of the resin to form the first insulating resin layers 30 and 31 and the arranging to form the second insulating resin layers 40a, 40b, 40c, and 40d are finished, heating is performed to harden the resin. This heating hardens both the first insulating resin layers 30 and 31 and the second insulating resin layers 40a, 40b, 40c, and 40d, such that the lowest layer coils 60 on the steps of the coil 14 are fixed to the insulator 16, and the surface layer coils 70 on the steps of the coil 14 are connected together in a fixed state.

There are several ways to wind a two-layer winding coil, other than those described with reference to FIGS. 3 and 4, depending on the specifications of the stator 10. For example, on the first step 1, the lowest layer coil 60 is first wound around the tooth 22, and then the surface layer coil 70 is wound on top of the lowest layer coil 60. Then from the surface layer coil 70 on the first step 1, the coil moves to the second step 2, where the lowest layer coil 60 is first wound on the second step 2, and then the surface layer coil 70 of the second step 2 is wound on top of this lowest layer coil 60, and so on and so forth. According to this method, the overall length of the conducting wire is fairly long, but the coil 14 is able to be wound by a direct winding method on the tooth 22 side without forming a cassette coil.

Also, a two-layer winding coil of the lowest layer coil 60 and the surface layer coil 70 is also able to be formed using a method in which two conducting wires are overlapped and wrapped once around, just as in a conducting wire assembly. With this method, the winding starting end and the winding terminal end are each two conducting wires, so a process to make a series connection or a parallel connection at the coil ends and the like is necessary, but winding can be performed by a direct winding method on the tooth 22 side without forming a cassette coil.

There is also a method that does not involve forming the lowest layer coil 60 and the surface layer coil 70 on each step. With this method, the lowest layer coil 60 is wound with a predetermined number of steps from the base side toward the tip end side of the tooth 22, and then the surface layer coil 70 is wound with a predetermined number of steps from the tip end side toward the base side of the tooth 22. With this method, with a two-layer winding, the winding starting end and the winding terminal end are both on the base side of the tooth 22, but winding is able to be performed by a direct winding method on the tooth 22 side without forming a cassette coil.

In the description above, a two-layer winding is described, but there are similarly several multi-layer winding methods for a multi-layer winding as well. Depending on the method, direct winding on the tooth 22 side may be difficult, so a cassette coil may be formed and used. Also, depending on the method, the height in the axial direction of the coil on each step at the curved portion 50b and the like may be uneven. The first insulating resin layers 30 and 31 and the second insulating resin layers 40a, 40b, 40c, and 40d described with reference to FIGS. 1, 2, and 5 are able to be applied regardless of which multi-layer winding method is used.

As shown in FIG. 5, neither the first insulating resin layers 30 and 31 nor the second insulating resin layers 40a, 40b, 40c, and 40d are formed in the gap between the lowest layer coil 60 and the surface layer coil 70. The length of a connecting portion 54 of the lowest layer coil 60 and the surface layer coil 70 is short, but the rigidity of the connecting portion 54 is quite height, so the coil 14 is able to be prevented from moving even if a gap is provided in the space between the lowest layer coil 60 and the surface layer coil 70.

Figure 6:
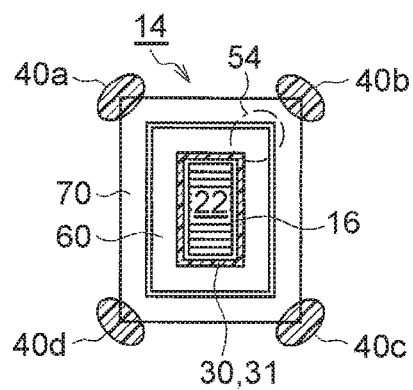
FIG. 6 is a view showing a frame format of the arrangement of the first insulating resin layer and the second insulating resin layer in a two-layer winding.

FIG. 6 is a view showing a frame format of the coil 14 of the two-layer winding. With the coil 14 of the two-layer winding, the lowest layer coil 60 is fixed to the insulator 16 by the first insulating resin layers 30 and 31, and the surface layer coils 70 are fixed and integrated together across the plurality of steps by the second insulating resin layers 40a, 40b, 40c, and 40d. The surface layer coil 70 and the lowest layer coil 60 are connected by the connecting portion 54, so the connecting portion 54 acts as resistance to movement of the surface layer coil 70 with respect to the lowest layer coil 60. If the rigidity as resistance is sufficiently high due to the length of the connecting portion 54 being short or the like, the surface layer coil 70 is able to be prevented from moving with respect to the lowest layer coil 60.

If the rigidity of the connecting portion 54 becomes relatively low with respect to external force such as vibration due to, for example, the total number of windings of the coil 14 increasing or the number of steps increasing, or the number of connecting portions 54 increasing or the length thereof increasing, movement of the surface layer coil 70 with respect to the lowest layer coil 60 may not be able to be sufficiently prevented. An example of this is illustrated with a coil 80 of a four-layer winding in a frame format in FIG. 7.

Figure 7:
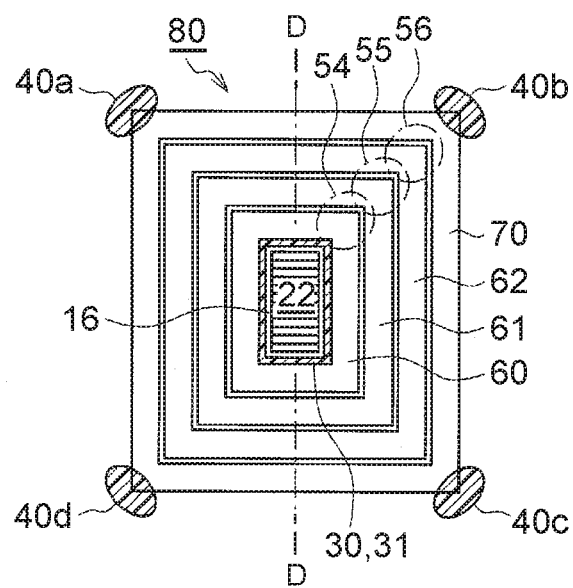
FIG. 7 is a view showing a frame format of the arrangement of a first insulating resin layer and a second insulating resin layer in a four-layer winding.

The coil 80 in FIG. 7 is a four-layer winding, so the one winding coil that is arranged closest to the tooth 22 side and fixed by the first insulating resin layers 30 and 31 will be referred to as the lowest layer coil 60. Also, the one winding coil that is arranged farthest on the surface side and in which the windings on the steps are fixed together by the second insulating resin layers 40a, 40b, 40c, and 40d will be referred to as the surface layer coil 70. The two winding coils that are arranged between the lowest layer coil 60 and the surface layer coil 70 will be referred to as intermediate layer coils 61 and 62. The lowest layer coil 60 and the surface layer coil 70 of the coil 80 in FIG. 7 are connected by three connecting portions 54, 55, and 56, so the rigidity with which the lowest layer coil 60 and the surface layer coil 70 are connected may be lower than with the coil 14 in FIG. 6. As a result, movement of the surface layer coil 70 with respect to the lowest layer coil 60 may not be able to be sufficiently prevented.

Figure 8:
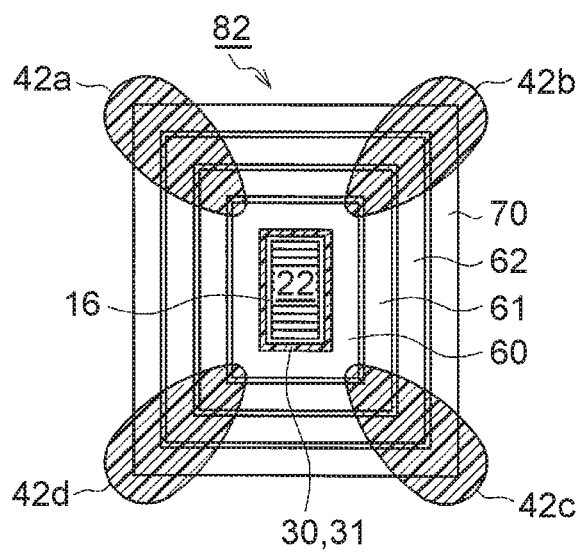
FIG. 8 is a view showing a frame format of the arrangement of the first insulating resin layer and the second insulating resin layer in a four-layer winding according to another example embodiment.

FIG. 8 is a view of an example of a structure of a coil 82 that is a four-layer winding coil, in which movement of the surface layer coil 70 with respect to the lowest layer coil 60 is able to be effectively prevented. Here, second insulating resin layers 42a, 42b, 42c, and 42d are formed not only at the curved portions 50a, 50b, 50c, and 50d of the surface layer coil 70, but also between the intermediate layer coils 62 and 61 and the lowest layer coil 60 on the lower layer side thereof. That is, the second insulating resin layers 42a, 42b, 42c, and 42d are all formed between the surface layer coil 70 and the intermediate layer coil 62, between the intermediate layer coil 62 and the intermediate layer coil 61, and between the intermediate layer coil 61 and the lowest layer coil 60. As a result, the surface layer coil 70 is fixed to the lowest layer coil 60 by the second insulating resin layers 42a, 42b, 42c, and 42d via the intermediate layer coils 62 and 61, so movement of the surface layer coil 70 with respect to the lowest layer coil 60 is able to be effectively inhibited.

The second insulating resin layers 42a, 42b, 42c, and 42d are arranged by means such as applying a predetermined resin from the outside of the surface layer coil 70 of the coil 82. As the predetermined resin, a liquid insulating resin having a viscosity that is suitably lower than that of the second insulating resin layers 40a, 40b, 40c, and 40d described with reference to FIGS. 5 and 6 may be used. In this case as well, the second insulating resin layers 42a, 42b, 42c, and 42d are arranged separated from each other, and at these separation regions, the surfaces on the surface layer side of the surface layer coil 70, the intermediate layer coils 62 and 61, and the lowest layer coil 60 are exposed in the insulation coated conducting wire state. As a result, the cooling performance by coolant or the like is able to be ensured.

Figure 9:
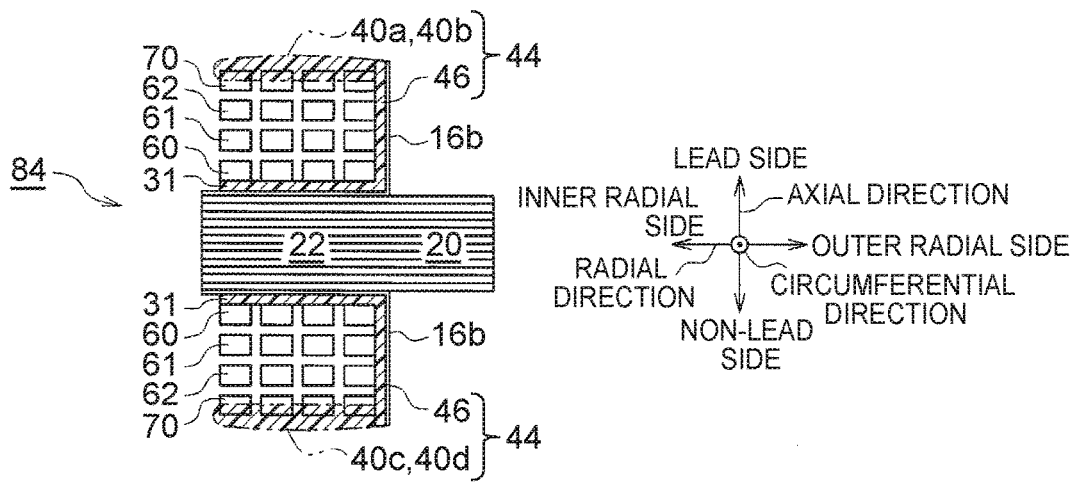
FIG. 9 is a view showing a frame format of the arrangement of the first insulating resin layer and the second insulating resin layer in a four-layer winding according to yet another example embodiment.

FIG. 9 is a view of an example of another structure of a coil 84 that is a four-layer winding coil, in which movement of the surface layer coil 70 with respect to the lowest layer coil 60 is able to be effectively prevented. FIG. 9 is a sectional view that corresponds to a sectional view taken along line D-D in FIG. 7. The second insulating resin layers 40a, 40b, 40c, and 40d in FIG. 7 do not appear in the sectional view taken along line D-D, and are thus indicated by the alternate long and two short dashes line.

As shown in FIG. 9, a second insulating resin layer 44 includes, in addition to the portions of the second insulating resin layers 40a, 40b, 40c, and 40d described with reference to FIG. 7, an additional insulating resin layer 46 that is formed between a wall surface on the stator yoke 20 side of the coil 84 and a wall surface portion 16b of the insulator 16. The additional insulating resin layer 46 is formed integrally connected to each of the second insulating resin layers 40a, 40b, 40c, and 40d and the first insulating resin layers 30 and 31. As a result, the surface layer coil 70 is fixed to the lowest layer coil 60 via the additional insulating resin layer 46, so movement of the surface layer coil 70 with respect to the lowest layer coil 60 is able to be effectively inhibited.

The methods described with reference to FIGS. 8 and 9 are applied to four-layer winding coils, but they are not limited to this. That is, these methods may be applied when the rigidity of the connecting portion 54 with respect to an external force such as vibration is relatively low due to, for example, the total number of windings of the coil 14 increasing or the number of steps increasing, or the number of connecting portions 54 increasing or the length thereof increasing. For example, the methods described with reference to FIGS. 8 and 9 may also be suitably applied to a two-layer winding as well when it is necessary to increase the rigidity of the connecting portion 54 due to the winding method or some other reason.

Figure 10:
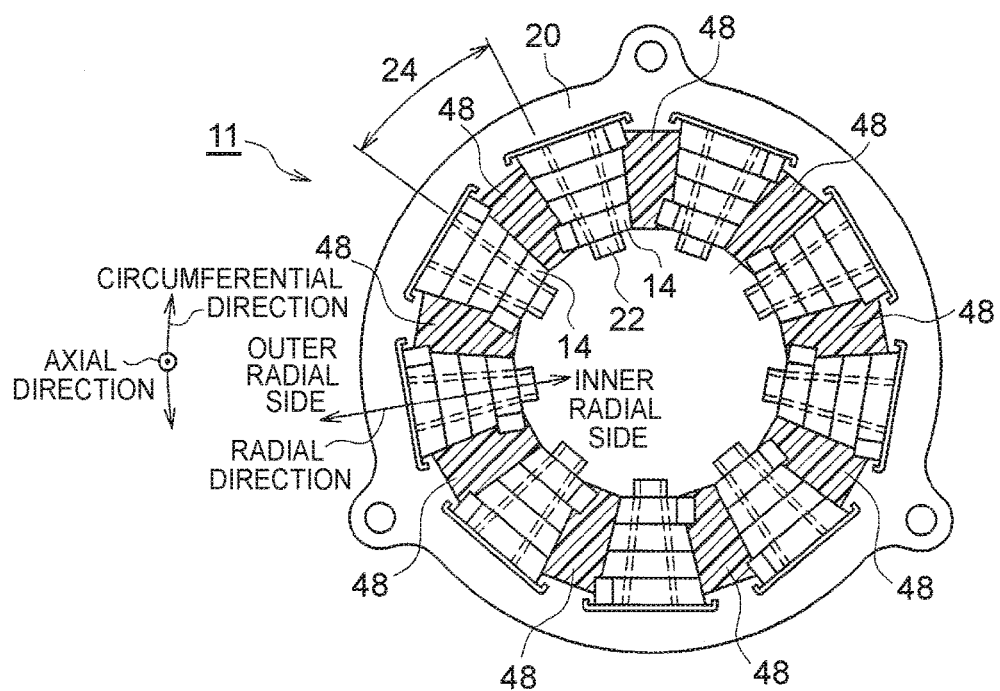
FIG. 10 is a view of a modified example of the structure shown in FIG. 1.

A stator 11 shown in FIG. 10 is a modified example of the structure shown in FIG. 1. In the stator 11, a second insulating resin layer 48 is formed extending across curved portions that face each other, of two coils 14 arranged in the same slot 24. The second insulating resin layer 48 formed extending across two curved portions 50a and 50b that face each other, of the two coils 14 in the same slot 24, from among the four curved portions 50a, 50b, 50c, and 50d described with reference to FIG. 4, are shown on the lead side in FIG. 10. A second insulating resin layer formed extending across two curved portions 50c and 50d that face each other, of the two coils 14 in the same slot 24, are on the non-lead side. Using the structure shown in FIG. 10 makes it possible to reduce the amount of insulating resin that is used, and further reduce the number of man-hours required to apply the insulating resin, and the like.

What is claimed is:

1. A rotary electric machine stator comprising:
    a stator core that includes an annular stator yoke, and a plurality of teeth that protrude toward an inner peripheral side from the annular stator yoke;
    at least one multi-layer winding coil that is wound around a rectangular cross-section of the teeth that is perpendicular to a radial direction of the teeth, the multi-layer winding coil being arranged with a predetermined number of steps in the radial direction of the teeth, each step of the multi-layer winding coil including a lowest layer coil of one winding and a surface layer coil of another winding;
    a first insulating resin layer that is arranged between the teeth and the lowest layer coil, or between an insulator that is fixed to the teeth and the lowest layer coil; and
    a second insulating resin layer that is arranged locally at curved portions of the multi-layer winding coil that correspond to corner portions of four corners of the rectangular cross-section of the teeth, the second insulating resin layer being arranged extending across a plurality of steps of the multi-layer winding coil.

2. The rotary electric machine stator according to claim 1, wherein
    the at least one multi-layer winding coil comprises a pair of multi-layer winding coils arranged adjacent to one another with a slot therebetween; and
    the second insulating resin layer extends across the slot between opposing curved portions of the pair of multi-layer winding coils.

3. The rotary electric machine stator according to claim 1, wherein the second insulating resin layer is also arranged between the surface layer coil and a coil on a lower layer side of the surface layer coil at the curved portions.

4. The rotary electric machine stator according to claim 1, wherein the second insulating resin layer is also arranged between the surface layer coil, a coil on a lower layer side of the surface layer coil, and the lowest layer coil at the curved portions.

5. The rotary electric machine stator according to claim 1, wherein
the second insulating resin layer extends across each of the steps of the multi-layer winding coil at the curved portions; and
the second insulating resin layer is arranged between a wall surface on the annular stator yoke side of a slot between adjacent teeth and the surface layer coil.

6. The rotary electric machine stator according to claim 1, wherein the second insulating resin layer comprises a plurality of second insulating resin layers arranged locally at respective curved portions.

7. The rotary electric machine stator according to claim 6, wherein each second insulating resin layer of the plurality of second insulating resin layers is separated from the other second insulating resin layers so as to provide a plurality of separation regions in which the multi-layer winding coil is exposed.

8. A rotary electric machine stator comprising:
a stator core that comprises an annular stator yoke, and a plurality of teeth that protrude toward an inner peripheral side from the annular stator yoke;
at least one multi-layer winding coil that is wound around a rectangular cross-section of the teeth that is perpendicular to a radial direction of the teeth, the multi-layer winding coil being arranged with a predetermined number of steps in the radial direction of the teeth, each step of the multi-layer winding coil including a lowest layer coil of one winding, a surface layer coil of another winding, and at least one intermediate layer coil of another winding arranged between the lowest layer coil and the surface layer coil;
a first insulating resin layer that is arranged between the teeth and the lowest layer coil, or between an insulator that is fixed to the teeth and the lowest layer coil; and
a second insulating resin layer that is arranged at curved portions of the multi-layer winding coil that correspond to corner portions of four corners of the rectangular cross-section of the teeth, the second insulating resin layer being arranged extending across a plurality of steps of the multi-layer winding coil.

9. The rotary electric machine stator according to claim 8, wherein the second insulating resin layer is also arranged between the surface layer coil and the at least one intermediate layer coil at the curved portions.

10. The rotary electric machine stator according to claim 8, wherein the second insulating resin layer is also arranged between the surface layer coil, the at least one intermediate layer coil, and the lowest layer coil at the curved portions.

11. The rotary electric machine stator according to claim 8, wherein
the second insulating resin layer extends across each of the steps of the multi-layer winding coil at the curved portions; and
the second insulating resin layer is arranged between a wall surface on the annular stator yoke side of a slot between adjacent teeth and the surface layer coil.

12. The rotary electric machine stator according to claim 8, wherein the second insulating resin layer comprises a plurality of second insulating resin layers arranged locally at respective curved portions.

13. The rotary electric machine stator according to claim 12, wherein each second insulating resin layer of the plurality of second insulating resin layers is separated from the other second insulating resin layers so as to provide a plurality of separation regions in which the multi-layer winding coil is exposed.

\* \* \* \* \*